United States Patent
Sasaki

(10) Patent No.: US 6,677,867 B2
(45) Date of Patent: Jan. 13, 2004

(54) DATA CONVERSION CIRCUIT, DIGITAL CAMERA AND DATA CONVERSION METHOD

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 10/360,797

(22) Filed: Feb. 10, 2003

(65) Prior Publication Data

US 2003/0151531 A1 Aug. 14, 2003

(30) Foreign Application Priority Data

Feb. 13, 2002 (JP) ........................................ 2002-035320

(51) Int. Cl.[7] ................................................. H03M 7/40
(52) U.S. Cl. ......................................... 341/106; 341/50
(58) Field of Search ................................. 341/106, 107, 341/50, 67, 65

(56) References Cited

U.S. PATENT DOCUMENTS 6,563,442 B1 * 5/2003 Luna ........................... 341/106

FOREIGN PATENT DOCUMENTS

JP 11-252372 9/1999

* cited by examiner

*Primary Examiner*—Brian Young
(74) *Attorney, Agent, or Firm*—Oblon, Spivak, McClelland, Maier & Neustadt, P.C.

(57) ABSTRACT

An object of the present invention is to reduce bit depth and word number of a LUT memory 12 as small as possible, while obtaining γ conversion output data with accuracy superior to the bit depth. Outputting table output data Dout0 and Dout1 which are associated with first table input data RA0 addressed and inputted to the LUT memory 12 and second table input data RA1 obtained by adding "1" thereto, and interpolating them outside the LUT memory 12, thereby obtaining output data having a larger bit depth than the LUT memory 12. At this time, the speed of signal processing is improved by employing a dual port memory as the LUT memory 12 or using a register group for the single port memory. Also, when the second table input data RA1 overflows, a specific value is employed as an alternative.

30 Claims, 10 Drawing Sheets

F I G. 1
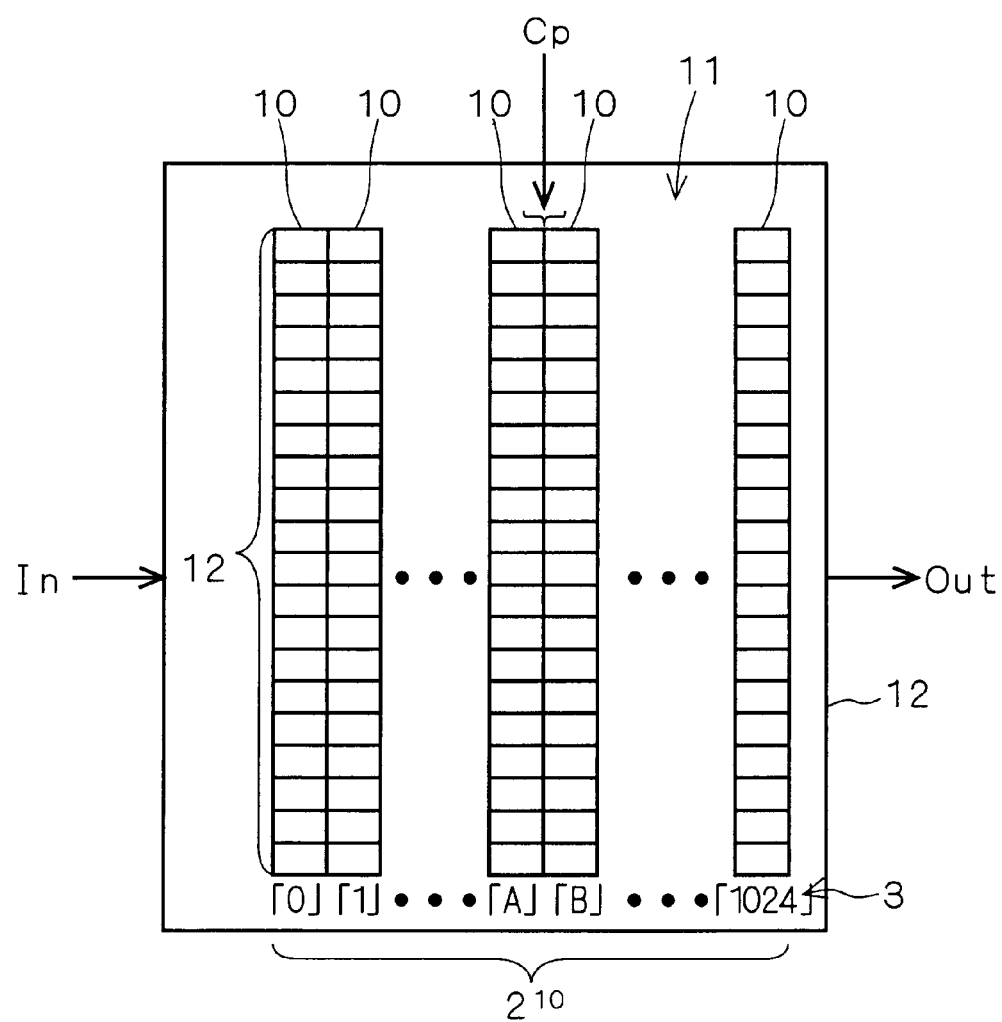

F I G. 5
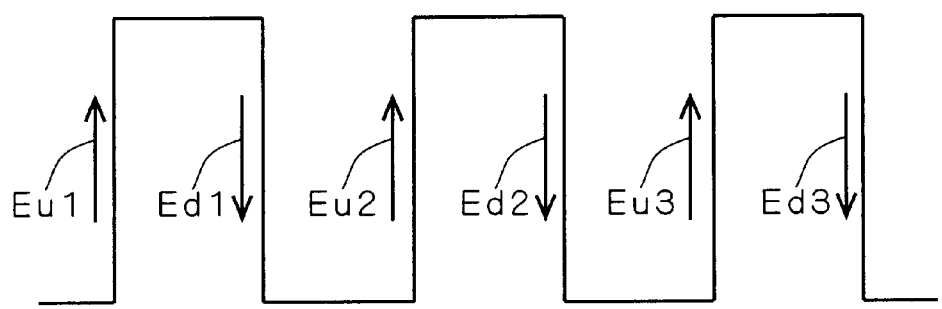

F I G. 1 1
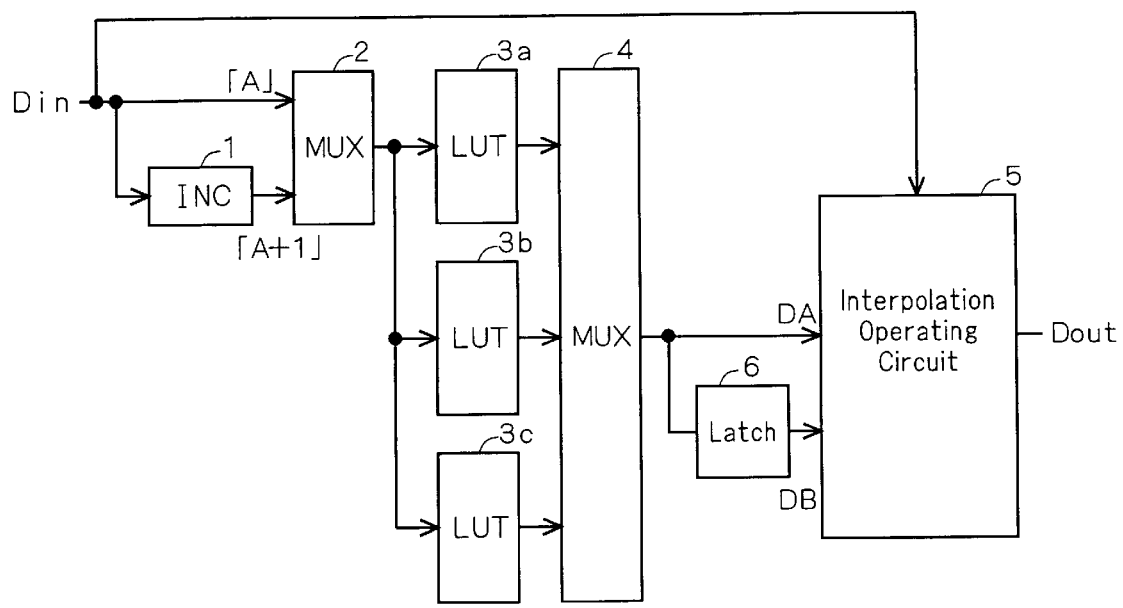

DATA CONVERSION CIRCUIT, DIGITAL CAMERA AND DATA CONVERSION METHOD

BACKGROUND OF THE INVENTION

1. Field of the Invention

The present invention relates to a data conversion circuit for converting intended input data into output data using a look-up table for conversion which defines correspondence between input and output, and a technique associated with the same.

2. Description of the Background Art

In the field of image processing, output data is sometimes created by correcting input data, and in such a situation, correspondence of output data to the input data is used as correction data while referring to a reference table for data conversion which is called a look-up table (LUT: look-up table for conversion).

This look-up table is provided in an internal memory called a LUT memory (look-up table storage memory) in a digital camera, for example. In the case where input signals obtained from charge coupled devices (CCD) used in this digital camera are used in their linear characteristics, as for the dynamic range, it is difficult to completely realize ideal dynamic range because of the internal settings of the digital camera and restrictions of video output format. For this reason, signals having levels higher than the saturation level 100IRE of the RS-170 format, for example, are truncated. In such a case, for the purpose of executing the preprocessing at high speed inside the digital camera by fully using the dynamic range of the input signal, a γ conversion look-up table is used.

Now referring to FIG. 9, a general γ conversion look-up table 3 will be described. In the γ conversion look-up table 3, memory cells (word) 8 which are in number corresponding to the number of bits of input data In are prepared, and a data size (bit depth) of each memory cell 8 corresponds to the number of bits of output data Out. In the example of FIG. 9, input data In of 10 bits is inputted and 8-bit output data is outputted. In this case, as the input data In is inputted into the γ conversion look-up table 3, a value of 10 bits of this input data In (that is, $2^{10}$ patterns or values of 0 to 1023: hereinafter referred to as "word number") is addressed, a memory cell 8 having the address of this value is selected, and 8-bit data of the memory cell 8 thus selected is outputted as output data Out.

Conventionally, a complete look-up table should be configured by a LUT memory, however, as shown in FIG. 10, for example, when γ conversion of image data is to be conducted by using the γ conversion look-up table 3 where both of the input data In and output data Out are required to be 16 bits, the word number of memory cells 8 having a bit depth of 16 bits becomes as large as $2^{16}$=65536, which makes the circuit scale extremely large.

In consideration of the above, Japanese Patent Application Laid-Open No. 11-252372, for example, discloses a technique which effectively uses a look-up table. In this technique, as shown in FIG. 11, data "A" which is input data Din of 12-bit line and data "A+1" obtainable by adding "1" to the data "A" by an adder (INC) 1 are yielded, and data of upper 10-bit lines from these 12-bit line data ("A"/"A+1") are switched by a multiplexer (MUX) 2 for outputting to three γ conversion look-up tables (LUT) 3a to 3c for three colors, R, G and B. Then outputs (8-bit data) from the respective color components of these γ conversion look-up tables 3a to 3c are sequentially switched and selected by a color selecting multiplexer 4, and data DA thus selected is outputted to an interpolation arithmetic circuit 5 and a latch circuit 6.

At the latch circuit 6, the data DA is latched and a resultant data DB (B=A+1) is outputted to the interpolation arithmetic circuit 5. In other words, since the data DA and the data DB are inputted to the interpolation arithmetic circuit 5 in synchronization with each other owing to the latch at the latch circuit 6, data in the γ conversion look-up tables 3a to 3c is fetched in a timely-overlapped manner.

Then the interpolation arithmetic circuit 5 receives at its input, data for lower 2 bits of the input data Din (that is, 12 "bits"–10 "upper bits") in addition to the above 8-bit data DA and DB, determines an interpolation ratio P in accordance with the data of lower 2 bits, executes the calculation of DA+(DB–DA)×P, and outputs the calculation result as output data Dout.

In this manner, according to the conventional technique, since a γ conversion can be conducted with respect to input data whose bit number is larger than the bit depth of each memory cell (word) of the look-up table, output data Out having a sufficient bit number can be outputted even by using the LUT memories 3a to 3c having relatively small memory sizes.

Even with such a conventional technique, the bit length of output data Out is restricted by the bit depth of the respective γ conversion look-up table 3a to 3c, which disabled the γ conversion where the bit lengths of input and output are the same to be conducted.

SUMMARY OF THE INVENTION

In view of the above, it is an object of the present invention to provide a data conversion circuit which is able to realize a conversion output with a fineness superior to the bit depth of the LUT memory by using a LUT memory of less memory size, and related arts.

The present invention provides a data conversion circuit for converting intended input data into output data using a look-up table for conversion which defines correspondences between input and output, the data conversion circuit including: an adder for adding "1" to first table input data which is upper bit data having a bit length corresponding to an input format of the look-up table for conversion among the input data, to yield second table input data; a look-up table storage memory storing the look-up table for conversion, for outputting first table output data associated with the first table input data using the look-up table for conversion, as well as outputting second table output data associated with the second table input data using the same the look-up table for conversion; and a weighting operation part for performing a weighting operation on the first table output data and the second table output data based on lower bit data excluding the predetermined bit number of upper bit data among the input data, interpolating between each of the table output data, and calculating output data having a bit length which is longer than that of the first table output data and the second table output data, wherein the look-up table storage memory is a dual port memory to which the first table input data and the second table input data are inputted simultaneously, and from which the first table output data and the second table output data are outputted simultaneously.

According to this, it is possible to obtain output data with a fineness superior to the bit depth of the look-up table storage memory while reducing the bit depth and word number of the look-up table storage memory as small as possible.

In this case, since the look-up table storage memory is a dual port memory to which the first table input data and the second table input data are simultaneously inputted and from which the first table output data and the second table output data are simultaneously outputted, it is possible to efficiently input two sets of table input data and to efficiently output two sets of table output data. Therefore, it is possible to achieve efficient data conversion.

In another aspect of the present invention, there is provided a data conversion circuit for converting intended input data into output data using a look-up table for conversion which defines correspondences between input and output, the data conversion circuit including: an adder for adding "1" to first table input data which is upper bit data having a bit length corresponding to an input format of the look-up table for conversion among the input data, to yield second table input data; a look-up table storage memory which is a single port memory storing the look-up table for conversion, for outputting first table output data associated with the first table input data using the look-up table for conversion, as well as outputting second table output data associated with the second table input data using the same the look-up table for conversion; a weighting operation part for performing a weighting operation on the first table output data and the second table output data based on lower bit data excluding the predetermined bit number of upper bit data among the input data, interpolating between each of the table output data, and calculating output data having a bit length which is longer than that of the first table output data and the second table output data; a table input data switching part for alternately selecting the first table input data or the second table input data to be inputted to the look-up table storage memory; and a table output data switching part for alternately selecting the first table output data or the second table output data outputted from the look-up table storage memory; wherein the table output data switching part selects the first table output data in a first pulse condition within a single cycle of clock signal for synchronizing output of the output data, while selecting the second table output data in a second pulse condition within the single cycle of clock signal.

According to this, even when a single port memory which is smaller in size than a dual port memory is used as the look-up table storage memory, two sets of table input data can be individually subjected to data conversion and outputted as respective table output data. In particular, by reading out output data twice in a single cycle of clock signal from the look-up table storage memory, it is possible to prevent the rate of outputting of the output data from being affected by the interpolation process.

Preferably, the data conversion circuit further includes a delay circuit for synchronizing timing of inputting the lower bit data to the weighting operation part with an operation of the table output data switching part.

According to this, since the timing of inputting the lower bit data for the weighting operation process is synchronized with the operation of the table output data switching process by way of a delay process, the interpolation process can be executed without any problems.

In another aspect of the present invention, there is provided a data conversion circuit for converting intended input data into output data using a look-up table for conversion which defines correspondences between input and output, the data conversion circuit including: an adder for adding "1" to first table input data which is upper bit data having a bit length corresponding to an input format of the look-up table for conversion among the input data, to yield second table input data; an even address table storage memory configured by a single port memory, for storing a value when the value of the upper bit data among the input data is an even number; an odd address table storage memory configured by a single port memory, for storing a value when the value of the upper bit data among the input data is an odd number; a first address selector arranged at input of the even address table storage memory, for inputting the first table input data as an address of the even address table storage memory when the upper bit data is an even number, while inputting the second table input data as an address of the even address table storage memory when the upper bit data is an odd number; a second address selector arranged at input of the odd number address table storage memory, for outputting the second table input data as an address of the odd number address table storage memory when the upper bit data is an even number, while outputting the first table input data as an address of the odd number address table storage memory when the upper bit data is an odd number; a first data selector arranged at outputs of the even address table storage memory and the odd address table storage memory, for outputting output data of the even address table storage memory as first table output data when the upper bit data is an even number, while outputting output data of the odd address table storage memory as first table output data when the upper bit data is an odd number; a second data selector arranged at outputs of the even address table storage memory and the odd address table storage memory, for outputting output data of the odd address table storage memory as second table output data when the upper bit data is an even number, while outputting output data of the even address table storage memory as second table output data when the upper bit data is an odd number; and a weighting operation part for performing a weighting operation on the first table output data and the second table output data based on lower bit data excluding the predetermined bit number of upper bit data among the input data, interpolating between each of the table output data, and calculating output data.

According to this, by interleaving the even input and the odd input, only the single port memories are required, so that the circuit scale is miniaturized and the power consumption is reduced. Also, since a double-speed operation is not necessary, it is possible to suppress the operation frequency, which contributes to reduction in power consumption.

Preferably, the data conversion circuit further includes an overflow preventing part for inputting the upper bit data of the input data before subjecting to addition by the adder as the second table input data to the look-up table storage memory when the first table input data inputted to the adder and the look-up table storage memory is the maximum value, thereby preventing overflow of the second table input data.

According to this, when the first table input data inputted to the adding process and the look-up table storage memory is the maximum value, the upper bit data of the input data before subjected to addition in the adding process can be inputted to the look-up table storage memory as the second table input data, so that it is possible to efficiently prevent the second table input data from overflowing.

In another aspect of the present invention, there is provided a data conversion circuit for converting intended input data into output data using a look-up table for conversion which defines correspondences between input and output, the data conversion circuit including: an adder for adding "1" to first table input data which is upper bit data having a bit length corresponding to an input format of the look-up table for conversion among the input data, to yield second table input data; a look-up table storage memory storing the look-up table for conversion, for outputting first table output data associated with the first table input data using the look-up table for conversion, as well as outputting second table output data associated with the second table input data using the same the look-up table for conversion; a weighting operation part for performing a weighting operation on the first table output data and the second table output data based on lower bit data excluding the predetermined bit number of upper bit data among the input data, interpolating between each of the table output data, and calculating output data; and a specific value designating part, when the first table input data inputted to the adder and the look-up table storage memory is the maximum value, for forcefully designating a specific value preliminary determined as a value corresponding to the maximum value as the second table output data.

According to this, in the interpolation process, when the first table input data inputted to the adding process and the look-up table storage memory is the maximum value, even if the second table input data overflows due to the adding process, an ideal specific value to be used as an alternative can be forcefully and readily designated by the specific value designating process.

Preferably, the specific value is designated so that the bit length thereof is longer than that of the second table output data, the data conversion circuit further including: a bit length adjuster for adding the value "zero" on the lower bit side so as to coincide respective bit lengths of the first table output data and the second table output data with the bit length of the specific value.

According to this, the specific value is designated so as to have a bit length longer than that of the second table output data, and the value "zero" can be added on the lower bit side by the bit length adjusting process so that the bit length of the first table output data and the second table output data coincide with the bit length of the specific value. Accordingly, an ideal specific value can be designated with problems as less as possible.

More preferably, the bit length of the specific value is set as same as the bit number of the output data.

According to this, since the bit length of the specific value is designated to be equal to the bit length of the output data, when the second table input data overflows due to the adding process in the interpolation process, the numerical accuracy of the specific value to be used as its alternative is satisfactorily improved. In particular, when the look-up table for conversion has input/output characteristic data for performing γ conversion of image data, the maximum value of the output range where the output data can lie is best employed as the ideal specific value.

More preferably, the look-up table for conversion has input/output characteristic data for performing γ conversion of image data.

According to this, since the look-up table for conversion has input/output characteristic data for performing γ conversion of image data, it is possible to readily execute γ conversion even with a reduced storage capacity of the look-up table storage memory which heretofore required a large capacity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a look-up table used in a data conversion circuit according to the first embodiment of the present invention;

FIG. 5 is a view showing a pixel clock signal used in the data conversion circuit according to the second embodiment of the present invention;

FIG. 11 is a block diagram showing a conventional data conversion circuit.

DESCRIPTION OF THE PREFERRED EMBODIMENTS

First Embodiment

Figure 2:
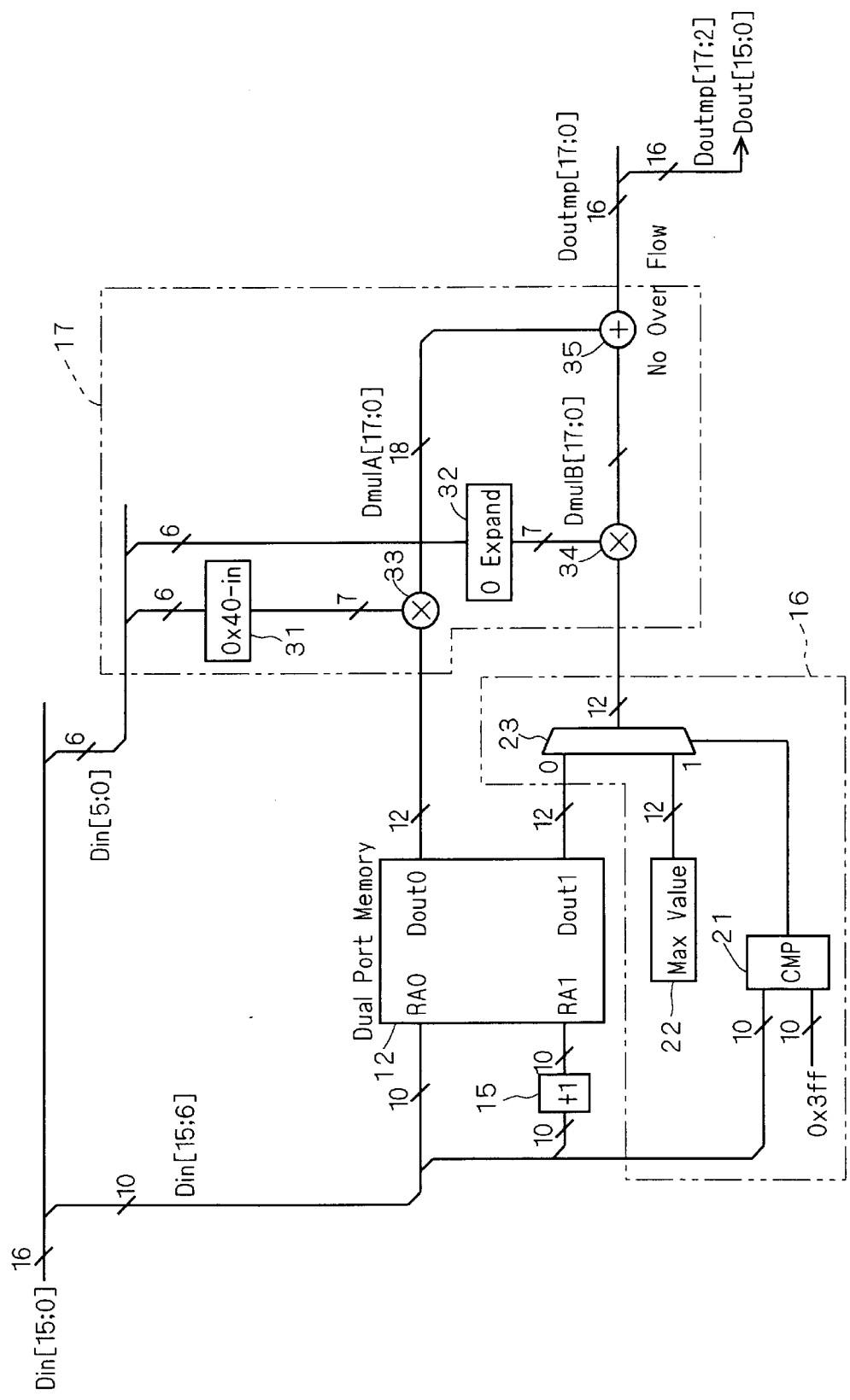
FIG. 2 is a circuitry block diagram showing the data conversion circuit according to the first embodiment of the present invention.

FIG. 1 is a block diagram showing a LUT memory (look-up table storage memory) 12 which stores a look-up table (LUT: look-up table for conversion) 11 in a data conversion circuit according to the first embodiment of the present invention, and FIG. 2 is a block diagram showing the data conversion circuit. In FIG. 2 and in this description, the two numbers indicated together inside the parentheses [] with a semicolon therebetween denote the uppermost position and the lowermost position of bits extracted from original binary number data, respectively, and the denotation "0x" is a prefix for a value which is a hexadecimal number.

This data conversion circuit is integrated in a digital camera, for example, and used for the purpose of conducting γ conversion on image data captured by CCD imaging. When the LUT memory 12 having a predetermined bit depth (12 bits) and a predetermined word number ($2^{10}$) is used as shown in FIG. 1, the data conversion circuit receives input data Din having a bit length which exceeds the word number of the LUT memory 12 (Din[15;0]), and outputs output data Dout having a bit length which exceeds the bit depth. In such a case, as shown in FIG. 2, the data conversion circuit inputs first table input data RA0 which is predetermined upper bits (10 bits) of the input data Din having a predetermined bit length (16 bits) to the LUT memory 12; adds "+1" to the first table input data RA0 and inputs the result to the LUT memory 12 as second table input data RA1; weights first and second table output data Dout0 and Dout1 which are outputted from the look-up table 11 in correspondence with the table input data RA0 and RA1, based on the remaining lower bits (16 bits minus 10 bits=6 bits) that are not inputted to the look-up table 11 from the input data Din and adds the results, and defines the value obtained by the addition as interpolated data that have been interpolated among memory cells 10 in the look-up table 11 (referred to as "interpolated data": denoted by the symbol "Cp" in FIG. 1) as output data Dout. Output data Dout having a bit number which is larger than the bit depth of the look-up table 11 is thus outputted by utilizing the fact that the bit length of each value increases at the time of the weighting operation.

Concretely, as shown in FIG. 2, this data conversion circuit includes: an adder 15 which receives data of upper 10 bits (Din[15;6]) of the 16-bit input data Din and adds an adding value "+1" to the 10-bit data; a LUT memory 12 for a look-up table 11, which performs an index conversion on each of 10-bit first table input data RA0 (=Din[15;6]) before subjected to addition at the adder 15 and 10-bit second table input data RA1 after subjected to addition at the adder 15 (these correspond to input data In in FIG. 1) to output 12-bit table output data Dout0 and Dout1 (these correspond to output data Out in FIG. 1) (see FIG. 1); a specific value designating part 16 for forcefully designating a maximum value as a specific value of the second table output data Dout1 (1-bit data in this embodiment) when the first table input data RA0 is the maximum value; and a weighting operation part 17 for performing weighting operation on the two table output data Dout0 and Dout1 from the look-up table 11 based on the lower 6-bit data Din[5;0] that have not been inputted to the look-up table 11 among the input data Din to obtain interpolated data Cp.

Herein as described above, in order to obtain single output data Dout, it is necessary to input the two table input data RA0 and RA1 which are the upper 10-bit data Din[15;6] of the input data Din and the data obtained by adding the adding value "+1" thereto. For this purpose, a dual port memory is used as the LUT memory 12 for storing the look-up table 11, which enables almost simultaneous input of the two table input data RA0 and RA1 to the LUT memory 12, while enabling almost simultaneous output of the 12-bit table output data Dout0 and Dout1, the results obtained by looking up the look-up table 11 for the table input data RA0 and RA1. The internal look-up table 11 is configured as same as those illustrated in FIG. 1.

The specific value designating part 16 includes a comparator (CMP) 21 for comparing and determining whether or not the upper 10-bit data Din[15;6] of the input data Din is the maximum value (="0x3ff", that is, all values of 10 bits are "1"), and a selector 23 which selects the second table output data Dout1 from the LUT memory 12 as the 12-bit second table output data Dout1 if the Din[15;6] is not the maximum value (="0x3ff") based on the comparison result by the comparator 21, while selecting the maximum value (="0xfff":Max Value) 22 of 12-bit data as a specific value to forcefully designate the maximum value if the Din[15;6] is the maximum value (="0x3ff") based on the comparison result by the comparator 21.

The weighting operation part 17 includes: a first multiplication factor calculating part (In FIG. 2, denoted by "0x40–In") 31 which subtracts lower 6-bit data Din[5;0] of the input data Din from the value "0x40" to output 7-bit multiplication factor data (first multiplication factor data); a second multiplication factor calculating part (In FIG. 2, denoted by "0 Expand") 32 which adds 1-bit data of value "0" to an upper position of the lower 6-bit data Din[5;0] of the input data Din so as to correspond to the bit number of output data at the first multiplication factor calculating part 31 to output 7-bit multiplication factor data (second multiplication factor data); first and second multipliers 33 and 34 which multiplies the table output data Dout0 and Dout1 with the respective multiplication factor data outputted from the first and second multiplication factor calculating parts 31 and 32, respectively; and an adder 35 for adding the values of multiplication results at the multiplier 33 and 34.

Now operation of the data conversion circuit having such a configuration will be explained. First, as shown in FIG. 2, upper 10-bit data (Din[15;6]) from 16-bit input data Din is inputted as the first table input data RA0 to the LUT memory 12, the adder 15 and the comparator 21 of the specific value designating part 16, while the remaining lower 6-bit data (Din[5;0]) is inputted to the first and second multiplication factor calculating parts 31 and 32.

The adder 15 adds the adding value "+1" to the inputted upper 10-bit data (Din[15;6]) and outputs the result to the LUT memory 12.

The LUT memory 12, which is a dual port memory, inputs the upper 10-bit data RA0 (first table input data) of the input data Din and the second table input data RA1 which is obtained by adding an adding value "+10" to the first table input data almost simultaneously, and looks up the look-up table 11 (see FIG. 1) for them to output the results, 12-bit first and second table output data Dout0 and Dout1 almost simultaneously.

Figure 3:
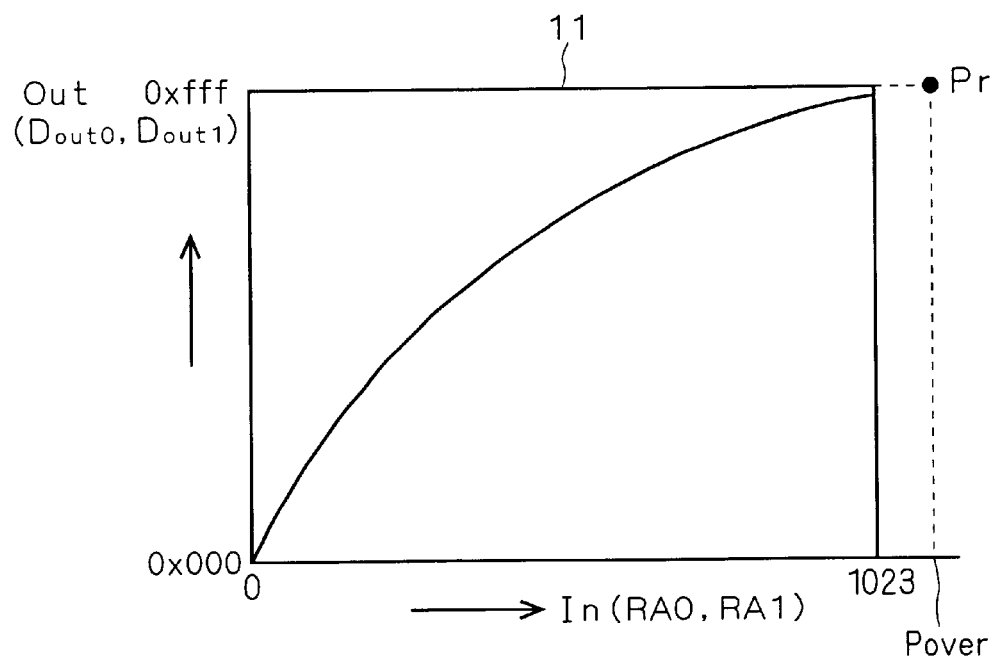
FIG. 3 is a graph of the look-up table used in the data conversion circuit according to the first embodiment of the present invention in a graph form.

Herein, in the case where the upper 10-bit data (Din [15;6]=RA0) of the input data Din is the maximum value "0x3ff", when the value "+1" is attempted to be added by the adder 15 for outputting the second table input data RA1, the second table input data RA1 will overflow, as shown by the point Pover in FIG. 3, suggesting that a memory cell 10 corresponding to the look-up table 11 in the LUT memory 12 does not exist. This leads the problem that how the second table output data Dout1 corresponding to the second table input data RA1 should be handled. In this case, the comparator 21 of the specific value designating part 16 compares and determines that Din[15;6] is the maximum value (="0x 3ff"), and on the basis of this, the selector 23 selects the maximum value (Max Value: for example, 0xfff) 22 of 12-bit data (point Pr in FIG. 3) and forcefully designates this maximum value as the value of the second table output data Dout1. On the other hand, in the case where the comparator 21 of the specific value designating part 16 compares and determines that the Din[15;6] does not the maximum value (="0x3ff"), the result of referring to the look-up table 11 is directly adopted as the second table output data Dout1.

Next, at the weighting operation part 17, the first multiplication factor calculating part 31 to which 6-bit data Din[5;0] of the input data Din is inputted subtracts lower 6-bit data Din[5;0] from the 7-bit value "0x40" to output 7-bit first multiplication factor data to the first multiplier 33. This first multiplication factor data will not underflow, and the minimum value is "0x0". The first multiplier 33 multiplies the first table output data Dout0 outputted from the LUT memory 12 with the first multiplication factor data to output 18-bit first multiplication result data DmulA[17;0].

Almost simultaneous and parallel with this, for the purpose of corresponding to the bit number of the output data at first multiplication factor calculating part 31, the second multiplication factor calculating part 32 adds 1-bit data of the value "0" at the upper position of the lower 6-bit data Din[5;0] of the input data Din to output 7-bit second multiplication factor data to the second multiplier 34. This second multiplication factor data will not overflow and the maximum value is "0x3f". The second multiplier 34 multiplies the second table output data Dout1 selected by the selector 23 of the specific value designating part 16 with the second multiplication factor data to output 18-bit second multiplication result data DmulB[17;0].

Thereafter, the adder 35 adds the multiplication result data DmulA[17;0] and DmulB[17;0] multiplied at the multiplier 33 and 34 to each other, and outputs 18-bit temporary output data Douttemp[17;0]. Then, a necessary number of bits are extracted from the upper side. For example, when 16-bit data is required as output data, upper 16-bit data Douttemp [17;2] of the temporary output data Douttemp is extracted to yield 16-bit output data Dout[15;0]. This output data Dout [15;0], for example, in the case where the memory cell 110 of address "A" is designated as the first table input data RA0 and the memory cell 110 of address "B" is designated as the second table input data RA1(=RA0+1) in FIG. 1, is outputted as interpolated data where the intermediate position between these addresses "A" and "B" is artificially interpolated based on the lower 6-bit data Din[5;0] of the input data Din.

In the manner as described above, since addresses of adjacent memory cells 10 in the LUMT memory 12 are designated based on the upper 10-bit data Din[ 15;6] of the input data Din and the value obtaining by adding the adding value "+1" to that data, and the value of the intermediate position therebetween is externally interpolated based on the value of the lower 6-bit data Din[5;0] of the input data Din, it is possible to easily achieve output data Dout with a fineness superior to the bit depth of the LUT memory 12 while reducing the bit depth and word number of the LUT memory 12 as small as possible.

Also, since a dual port memory is adopted as the LUT memory 12 storing the look-up table 11, it is possible to input the two table input data RA0 and RA1 efficiently even with a small memory size, as well as to output the two table output data Dout0 and Dout1 efficiently.

Second Embodiment

Figure 4:
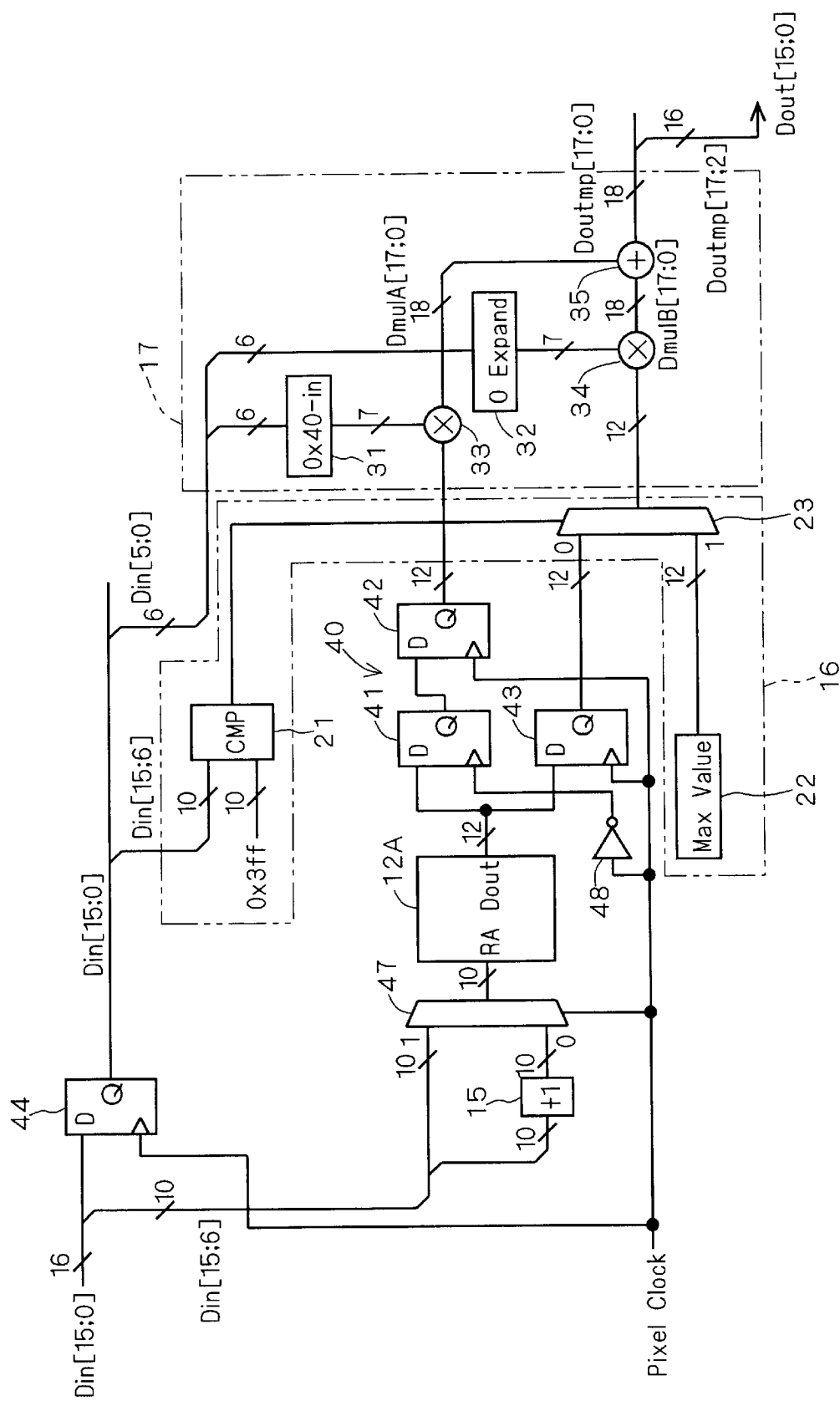
FIG. 4 is a circuitry block diagram showing a data conversion circuit according to the second embodiment of the present invention.

FIG. 4 is a block diagram showing a data conversion circuit according to the second embodiment of the present invention. In FIG. 4, elements having similar functions as those in the first embodiment are denoted by the same reference numerals.

In contrast to the first embodiment where a dual port memory is adopted as the LUT memory 12 storing the look-up table 11, in the data conversion circuit of the present embodiment which uses a single port memory as a LUT memory 12A as shown in FIG. 4, it is necessary to enter input data Din twice during a single cycle of pixel clock signal (Pixel Clock) for outputting a single pixel as output data Dout. For this reason, the conversion circuit of the present embodiment is further provided with a register group (table output data switching part) 40 for alternately switching and outputting first table output data (equivalent to "Dout0" of the first embodiment) and second table output data (equivalent to "Dout1" of the first embodiment) while synchronizing them and a selector (a table input data switching part) 47 for alternately switching the 10-bit data Din [15;6] of the original input data Din and data that is obtained by adding the adding value "+1" at the adder 15 when inputting table input data RA to the LUT memory 12A. Configurations of the specific value designating part 16 and the weighting operation part 17 are as same as those described in the first embodiment, and explanation will be made just for the elements which are different from those in the first embodiment.

The register group 40 consists of registers 41 to 44 and alternately reads output data from the LUT memory 12A in synchronization with the pixel clock signal (Pixel Clock) and allocates and outputs them to the first multiplier 33 of the weighting operation part 17 and the selector 23 of the specific value designating part 16.

To be more specific, the first register 41 of the register group 40 holds the output data from the LUT memory 12A, as shown by the reference symbol Ed1 in FIG. 5, from the rising timing of the pixel clock signal (Pixel Clock) that is inverted by the inverter circuit (NOT circuit) 48 (that is, falling timing of the original pixel clock signal: first pulse condition) until the next similar timing Ed2, for example, and transmits this held data to the next second register 42.

The second register 42 of the register group 40 holds the output data from the first register 41, as shown by the reference symbol Eu2 in FIG. 5, from the rising timing of the pixel clock signal (Pixel Clock) (second pulse condition) until the next similar timing Eu3, and transmits this held data to the first multiplier 33 of the weighting operation part 17.

The third register 43 of the register group 40 holds the output data from the LUT memory 12, from the rising timing of the pixel clock signal (Pixel Clock) (denoted by the reference symbol Eu2 in FIG. 5) until the next similar timing Eu3, and transmits this held data to the selector 23 of the specific value designating part 16.

The fourth register 44 functions as a delay circuit which, in supplying the comparator 21 of specific value designating part 16 with upper 10-bit data [15;6] and supplying the first and second multiplication factor calculating parts 31 and 32 of the weighting operation part 17 with lower 6-bit data Din[5;0], synchronizes these data with the first to fourth registers 41 to 43.

By configuring the register group 40 in this manner, output data from the LUT memory 12A is stored in the first register 41 at the time of falling of the pixel clock signal (Pixel Clock) and outputted from the second register 42 to the first multiplier 33 of the weighting operation part 17 at the time of the next rising of the pixel clock signal (Pixel Clock), and output data from the LUT memory 12A is stored in the third register 43 at the time of rising of the pixel clock signal (Pixel Clock) and outputted to the selector 23 of the specific value designating part 16. Therefore, output data can be obtained by accessing twice to the output data from the LUT memory 12A in a single cycle of the pixel clock signal as shown in FIG. 5. In the above, explanation was made for the case where the first register 41 operates at the falling timing of the pixel clock signal and the third register 43 operates at the rising timing of the pixel clock signal, however, the same operation can be achieved only by the rising operation utilizing clock-doubling technique.

The selector 47 is a switching device for alternately inputting the upper 10-bit data Din[15;6] of the input data Din and the data obtained by adding the adding value "+1" by the adder 15 to the upper 10-bit data Din[15;6] to the LUT memory 12A as the table input data RA.

As described above, in the present embodiment, output data Dout as same as that realized in the first embodiment can be outputted with respect to the input data Din even though a single port memory is used as the LUT memory 12A, so that an effect which is equivalent to that of the first embodiment can be achieved. In particular, by reading out the output data from the LUT memory 12A twice in a single cycle of the pixel clock signal (Pixel Clock), it is possible to prevent the processing speed from decreasing to lower than that of the first embodiment. Also, the single port memory usually has an advantage that the memory size can be made smaller than a dual port memory.

Third Embodiment

Figure 6:
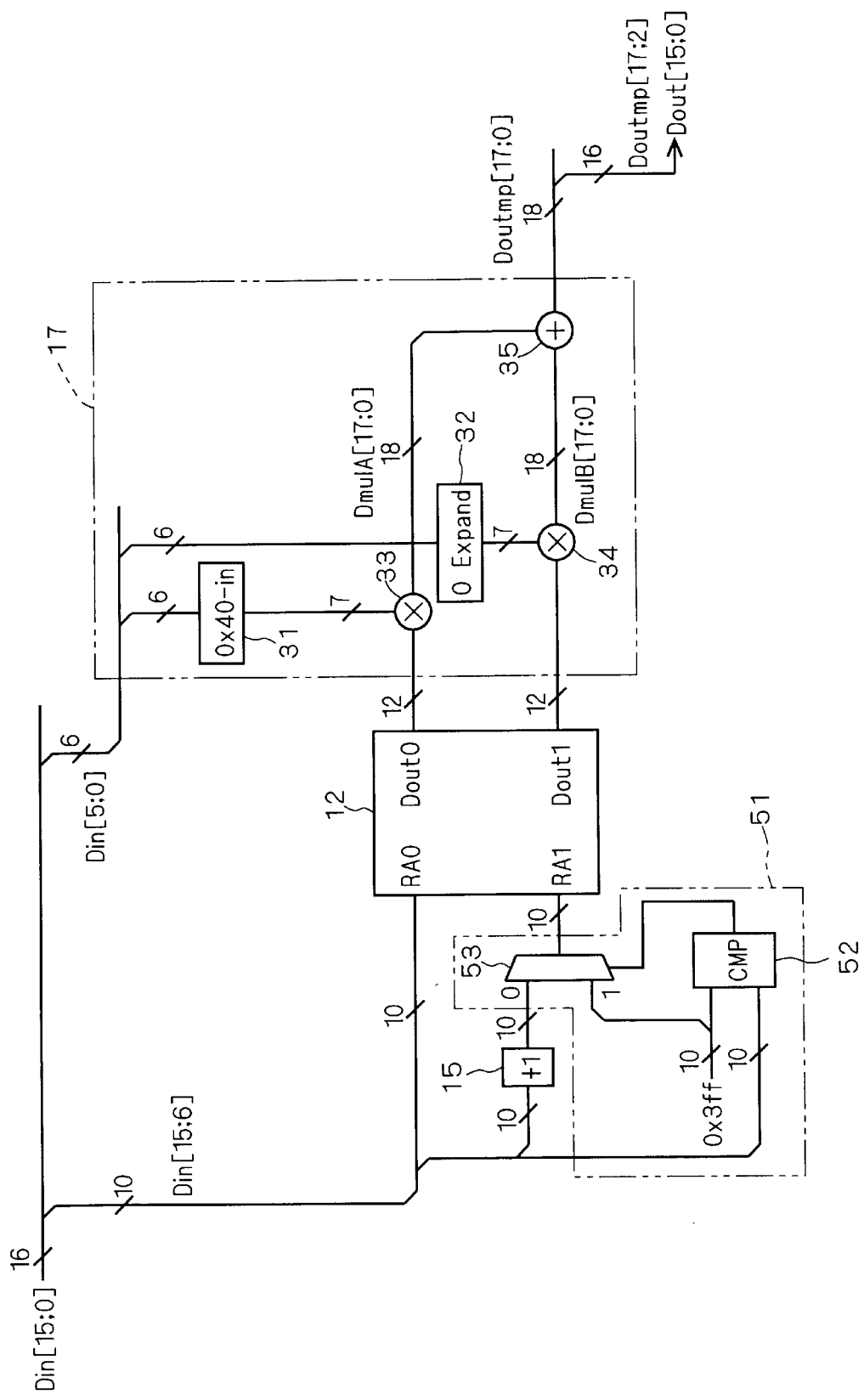
FIG. 6 is a circuitry block diagram showing a data conversion circuit according to the third embodiment of the present invention.

FIG. 6 is a block diagram showing a data conversion circuit according to the third embodiment of the present invention. In FIG. 6, elements having similar functions as those in the first embodiment are denoted by the same reference numerals. The data conversion circuit of the present embodiment omits the specific value designating part 16 in the first embodiment. That is, the present embodiment is as same as the first embodiment in that a dual port memory similar to the LUT memory 12 described in the first embodiment is used, and two outputs from the LUT memory 12 are subjected to the weighting operation using the lower 6-bit data Din[5;0] of the input data Din for outputting output data Dout having an elongated bit length.

Herein, in the case where the upper 10-bit data (Din [15;6]-RA0) of the input data Din is the maximum value "0×3ff", when the value "+1" is attempted to be added by the adder 15 so as to output the second table input data RA1, the second table input data RA1 will overflow, as shown by the point Pover in FIG. 3, suggesting that a memory cell 10 corresponding to the look-up table 11 in the LUT memory 12 does not exist. Therefore, in such a case, overflow of the second table input data RA1 is prevented by an overflow preventive part 51.

To be more specific, the overflow preventive part 51 includes a comparator (CMP) 52 for comparing and determining whether or not the upper 10-bit data Din[15;6] of the input data Din is the maximum value (="0×3ff", that is, all values of 10 bits are "1"), and a selector 53 which selects output data from the adder 15 (that is, the value obtained by adding the adding value "+1" to the upper 10-bit data Din[15;6] of the input data Din) when the Din[15;6] is not the maximum value (="0×3ff") based on the comparison result at the comparator 21, while selecting the maximum value (="0×3ff") when the Din[15;6] is the maximum value (="0×3ff") based on the comparison result at the comparator 21.

As a result of this, it is possible to efficiently prevent the second table input data RA1 from overflowing.

Compared with the first embodiment where the maximum value of the second table output data Dout1 is forcefully designated, the present embodiment just prevents overflow of the second table input data RA1 of the LUT memory 12, and since data in the look-up table 11 corresponding to the second table input data RA1 which is the maximum value is directly outputted as the table output data Dout1, it is impossible to ensure that the maximum value of the second table output data Dout1 is set at the maximum output value in the available range. Therefore, this embodiment is useful only for the case where such surety is not required.

Fourth Embodiment

Figure 7:
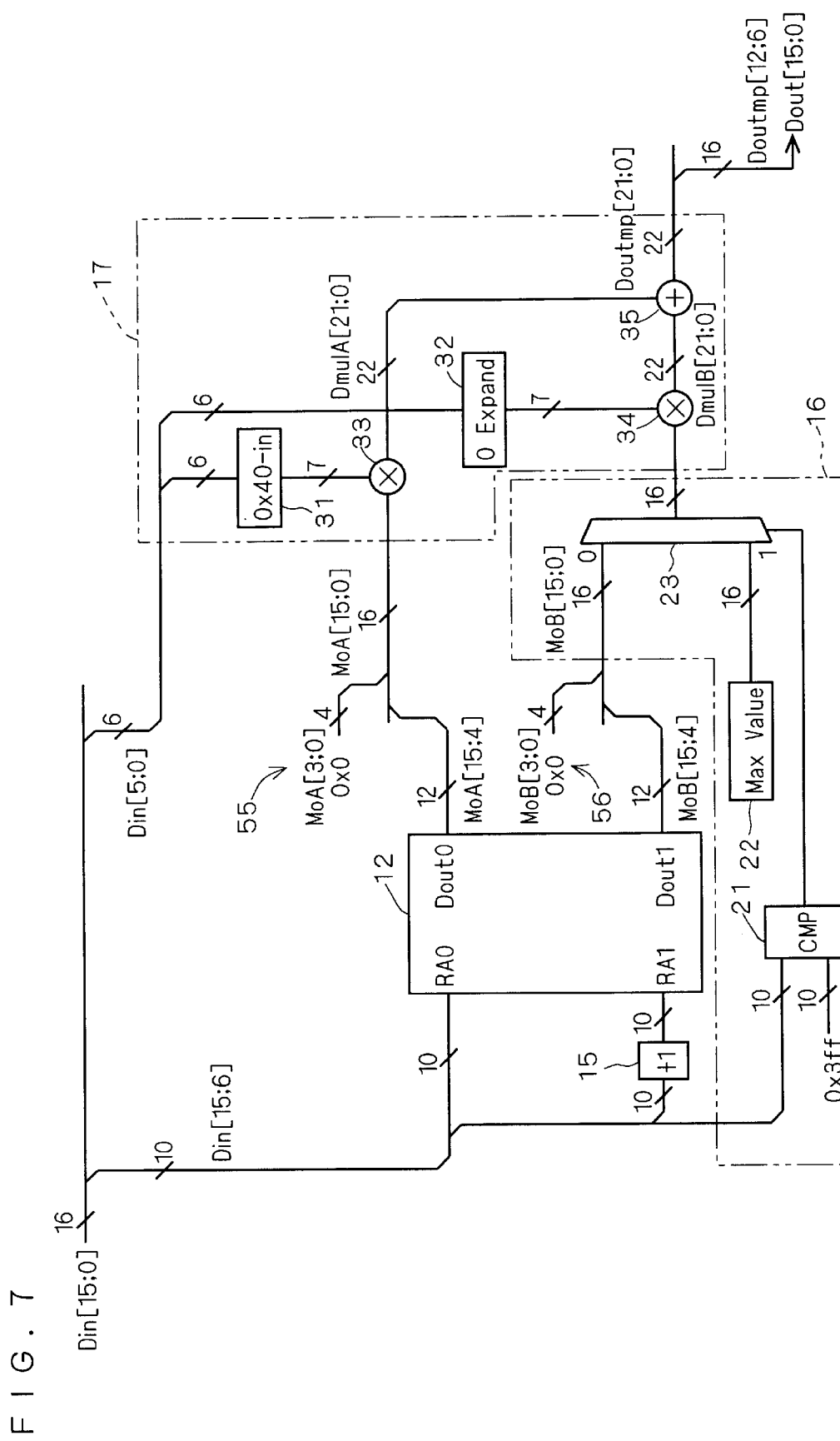
FIG. 7 is a circuitry block diagram showing a data conversion circuit according to the fourth embodiment of the present invention.

FIG. 7 is a block diagram showing a data conversion circuit according to the fourth embodiment of the present invention. In FIG. 7, elements having similar functions as those in the first embodiment are denoted by the same reference numerals.

This data conversion circuit is employed particularly for the case where it is desired that the maximum values are securely dealt over the entire range of the output data Dout with respect to the specific value designating part 16. And hence it is desired to preliminarily ensure 16-bit length for the data to be inputted to the weighting operation part 17 and the specific value designating part 16. However, since both of the two table output data Dout0 and Dout1 from the LUT memory 12 are 12-bit long, it is necessary to supply with data of 4-bit length. Therefore, in the present embodiment, in order to adjust the bit lengths of the first and second table output data Dout0 and Dout1 outputted from the LUT memory 12, bit length adjusters 55 and 56 are provided, and by means of these bit length adjusters 55 and 56, 4-bit zero value data MoA[3;0] and MoB[3;0] are respectively added to the lower bit side of the 12-bit first and second table output data Dout0 and Dout1. As a result of this, these data are adjusted to 16-bit data which are the same in length as the final output data Dout.

In association with this, the maximum value of the table output data Dout0 and Dout1 (Max Value) denoted by the reference numeral 22 is set to be 16-bit long.

Other configurations are as same as those of the first embodiment.

According to this embodiment, with respect to the output data Dout, a complete diode characteristic including the maximum value of the range can be realized.

Fifth Embodiment

Figure 8:
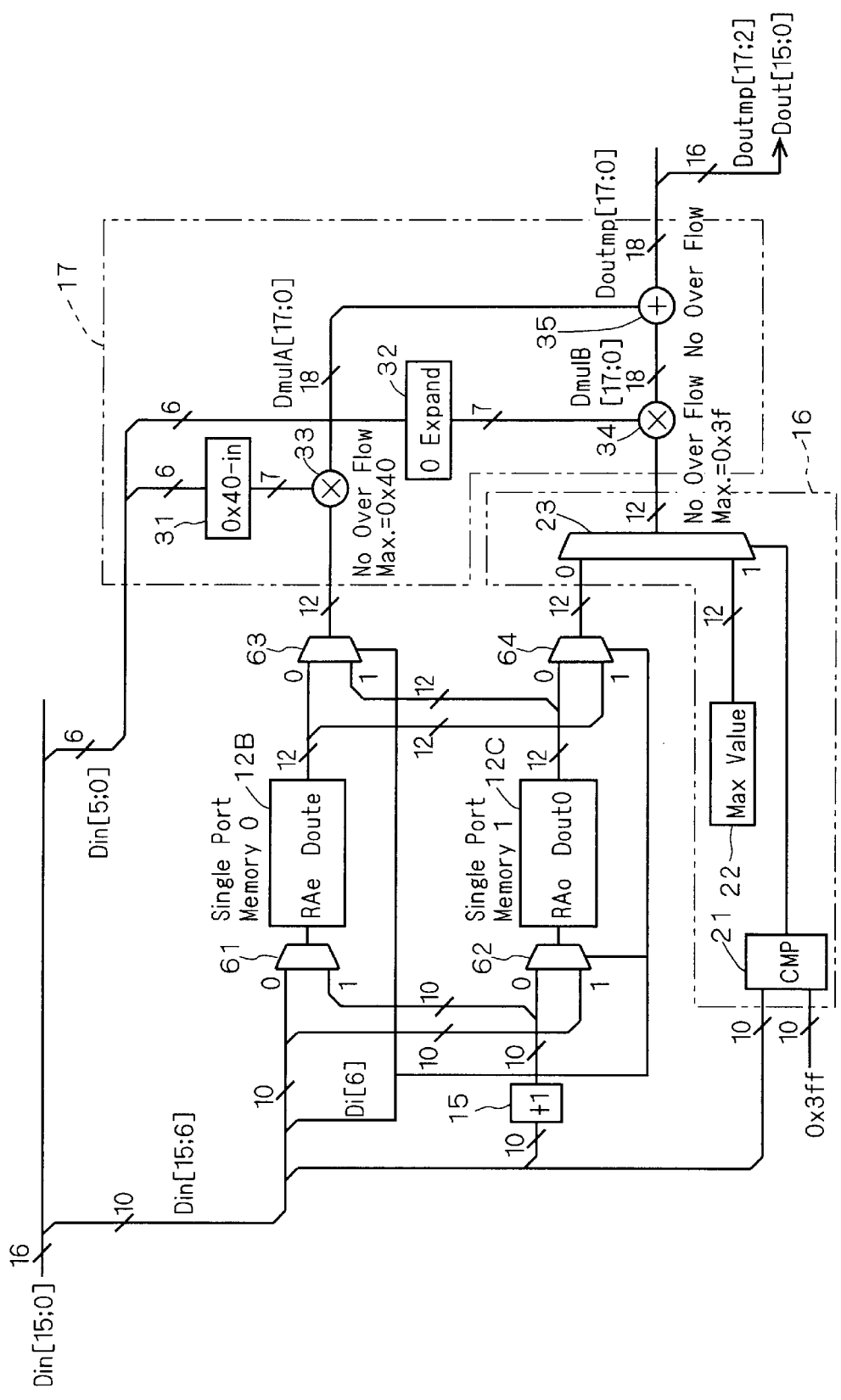
FIG. 8 is a circuitry block diagram showing a data conversion circuit according to the fifth embodiment of the present invention.
Figure 9:
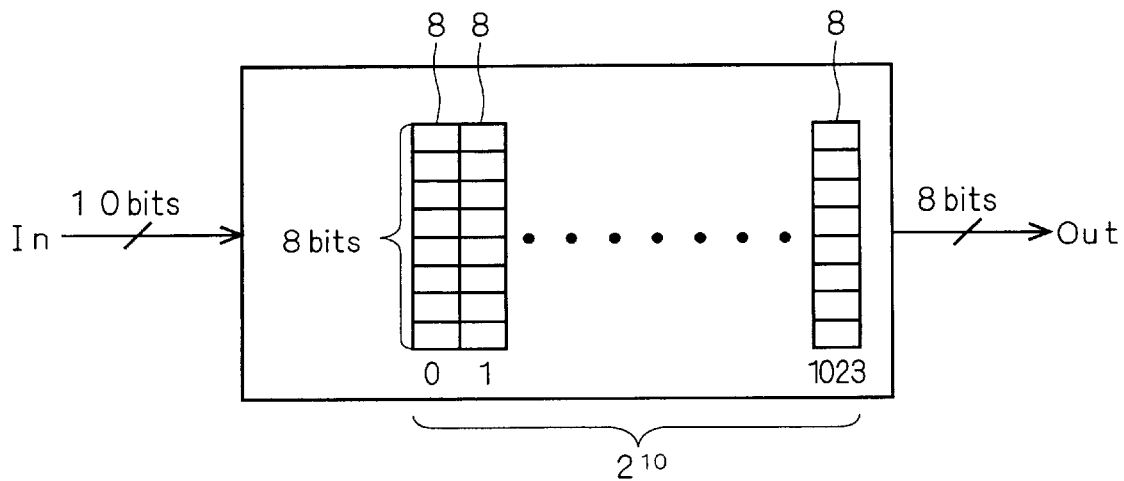
FIG. 9 is a view showing a general look-up table.
Figure 10:
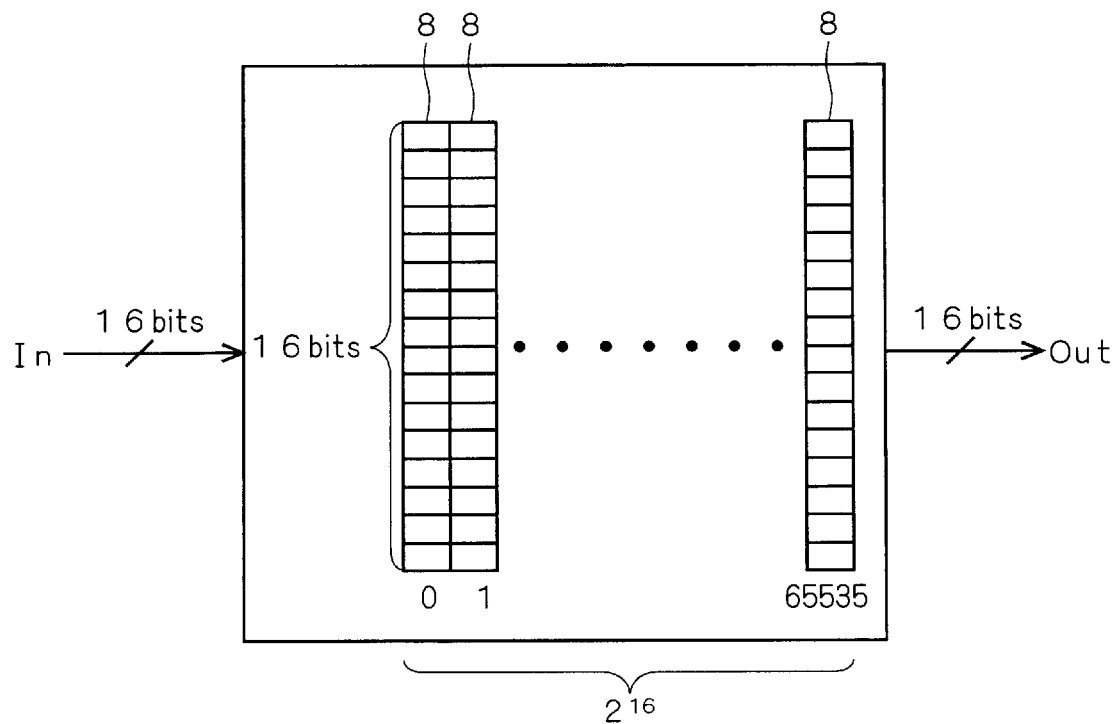
FIG. 10 is a view showing a look-up table in the case where both of input and output data are of 16-bit length.

FIG. 8 is a block diagram showing a data conversion circuit according to the fifth embodiment of the present invention. In FIG. 8, elements having similar functions as those in the first embodiment are denoted by the same reference numerals.

The present data conversion circuit includes: an adder 15 for adding the value "+1" to the first table input data as upper bit data Din[15;6] in the bit length (10 bits) corresponding to the input format of the look-up table for conversion among the input data Din(Din[15;0]), to yield second table input data; an even address table storage memory 12B configured by a single port memory, for storing a value "RAe" when the value of the upper bit data Din[15;6] among the input data Din is an even number; an odd address table storage memory 12C configured by a single port memory, for storing a value "RAo" when the value of the upper bit data Din[15;6] among the input data Din is an odd number; a first address selector 61 arranged at the input of the even address table storage memory 12B, for inputting the first table input data (in this case, the reference symbol "RAe") as an address of the even address table storage memory 12B when the upper bit data Din[15;6] is an even number, while inputting the second table input data (in this case, the reference symbol "RAe") as an address of the even address table storage memory 12B when the upper bit data Din[15;6] is an odd number; a second address selector 62 arranged at the input of the odd number address table storage memory 12C, for outputting the second table input data (in this case, the reference symbol "RAo") as an address of the odd number address table storage memory 12C when the upper bit data Din[15;6] is an even number, while outputting the first table input data (in this case, the reference symbol "RAo") as an address of the odd number address table storage memory 12C when the upper bit data Din[15;6] is an odd number; a first data selector 63 arranged at the outputs of the even address table storage memory 12B and the odd address table storage memory 12C, for outputting the output data Doute of the even address table storage memory 12B as the first table output data when the upper bit data Din[15;6] is an even number, while outputting the output data Douto of the odd address table storage memory 12C as the first table output data when the upper bit data Din[15;6] is an odd number; a second data selector 64 arranged at the outputs of the even address table storage memory 12B and the odd address table storage memory 12C, for outputting the output data Douto of the odd address table storage memory 12C as the second table output data when the upper bit data Din [15;6] is an even number, while outputting the output data Doute of the even address table storage memory 12B as the second table output data when the upper bit data Din[15;6] is an odd number; a weighting operation part 17 (as same as that of the first embodiment) for performing weighting operation on the first table output data and the second table output data based on lower bit data among the input data excluding a predetermined bit number of upper bit data Din[15;6] and performing interpolation between these table output data to calculate output data; and a specific value designating part 16 (as same as that of the first embodiment) for forcefully designating the maximum value as the a specific value of the second table output data (in this case, the reference symbol "Douto" since it is inevitably an odd number) when the upper bit data Din[15;6](first table input data) is the maximum value.

With the configuration as described above, when the input data Din is given, the adder 15 adds the value "+1" to the first table input data as the upper bit data Din[15;6] having a bit length (10-bit long) corresponding to the input format of the look-up table for conversion among the input data Din(Din[15;0]), to yield the second table input data.

Then, when the upper bit data Din[15;6] is an even number, the first address selector 61 inputs the first table input data (in this case, the reference symbol "RAe") as an address of the even address table storage memory 12B, while the second address selector 62 inputs the second table input data (in this case, the reference symbol "RAo") as an address of the odd address table storage memory 12C.

In this case, the first data selector 63 outputs the output data Doute of the even address table storage memory 12B as the first table output data, while the second data selector 64 outputs the output data Douto of the odd address table storage memory 12C as the second table output data.

On the other hand, when the upper bit data Din[15;6] is an odd number, the first address selector 61 inputs the second table input data (in this case, the reference symbol "RAe") as an address of the even address table storage memory 12B, while the second address selector 62 inputs the first table input data (in this case, the reference symbol "RAo") as an address of the odd address table storage memory 12C.

In this case, the first data selector 63 outputs the output data Douto of the odd address table storage memory 12C as the first table output data, while the second data selector 64 outputs the output data Doute of the even address table storage memory 12B as the second table output data.

With respect to these table output data thus outputted, interpolation is executed in the same manner as the first embodiment by means of the weighting operation part 17, to output 16-bit output data Dout[15;0].

In the manner as described above, according to the present embodiment, by interleaving the even input and the odd input with the use of two address table storage memories 12B and 12C, only single port memories are necessary, so that the circuit scale is miniaturized and the power consumption is reduced. Also, since a double-speed operation is not necessary, it is possible to suppress the operation frequency, which contributes to reduction in power consumption.

In the above embodiments, 16-bit input data Din is outputted after converted to 16-bit output data Dout, however, the bit lengths of the input data Din and output data Dout are not limited to the above number of bits.

Also, a normal LUT operation can be readily executed by using the same bit length for the data stored in the memory and the output data.

In the third embodiment and the fourth embodiment, explanation was made by way of the example which employs a dual port memory as described in the first embodiment as the LUT memory 12, however, a LUT memory 12A implemented by a single port memory as described in the second embodiment may be adopted without causing any problems.

While the invention has been shown and described in detail, the foregoing description is in all aspects illustrative and not restrictive. It is therefore understood that numerous modifications and variations can be devised without departing from the scope of the invention.

What is claimed is:

1. A data conversion circuit for converting intended input data into output data using a look-up table for conversion which defines correspondences between input and output, the data conversion circuit comprising:

an adder for adding "1" to first table input data which is upper bit data having a bit length corresponding to an input format of said look-up table for conversion among said input data, to yield second table input data;

a look-up table storage memory for storing said look-up table for conversion, for outputting first table output data associated with said first table input data using the look-up table for conversion, as well as outputting second table output data associated with said second table input data using the same said look-up table for conversion; and a weighting operation part for performing a weighting operation on said first table output data and said second table output data based on lower bit data excluding said predetermined bit number of upper bit data among said input data, interpolating between each of said table output data, and calculating output data having a bit length which is longer than that of said first table output data and said second table output data, wherein said look-up table storage memory is a dual port memory to which said first table input data and said second table input data are inputted simultaneously, and from which said first table output data and said second table output data are outputted simultaneously.

2. A data conversion circuit for converting intended input data into output data using a look-up table for conversion which defines correspondences between input and output, the data conversion circuit comprising:

an adder for adding "1" to first table input data which is upper bit data having a bit length corresponding to an input format of said look-up table for conversion among said input data, to yield second table input data;

a look-up table storage memory which is a single port memory storing said look-up table for conversion, for outputting first table output data associated with said first table input data using the look-up table for conversion, as well as outputting second table output data associated with said second table input data using the same said look-up table for conversion;

a weighting operation part for performing a weighting operation on said first table output data and said second table output data based on lower bit data excluding said predetermined bit number of upper bit data among said input data, interpolating between each of said table output data, and calculating output data having a bit length which is longer than that of said first table output data and said second table output data;

a table input data switching part for alternately selecting said first table input data or said second table input data to be inputted to said look-up table storage memory; and a table output data switching part for alternately selecting said first table output data or said second table output data outputted from said look-up table storage memory, wherein said table output data switching part selects said first table output data in a first pulse condition within a single cycle of clock signal for synchronizing output of said output data, while selecting said second table output data in a second pulse condition within said single cycle of clock signal.

3. The data conversion circuit according to claim 2, further comprising:

a delay circuit for synchronizing timing of inputting said lower bit data to said weighting operation part with an operation of said table output data switching part.

4. A data conversion circuit for converting intended input data into output data using a look-up table for conversion which defines correspondences between input and output, the data conversion circuit comprising:

an adder for adding "1" to first table input data which is upper bit data having a bit length corresponding to an input format of said look-up table for conversion among said input data, to yield second table input data;

an even address table storage memory configured by a single port memory, for storing a value when the value of the upper bit data among said input data is an even number;

an odd address table storage memory configured by a single port memory, for storing a value when the value of the upper bit data among said input data is an odd number;

a first address selector arranged at input of said even address table storage memory, for inputting said first table input data as an address of said even address table storage memory when said upper bit data is an even number, while inputting said second table input data as an address of said even address table storage memory when said upper bit data is an odd number;

a second address selector arranged at input of said odd number address table storage memory, for outputting said second table input data as an address of said odd number address table storage memory when said upper bit data is an even number, while outputting said first table input data as an address of said odd number address table storage memory when said upper bit data is an odd number;

a first data selector arranged at outputs of said even address table storage memory and said odd address table storage memory, for outputting output data of said even address table storage memory as first table output data when said upper bit data is an even number, while outputting output data of said odd address table storage memory as first table output data when said upper bit data is an odd number;

a second data selector arranged at outputs of said even address table storage memory and said odd address table storage memory, for outputting output data of said odd address table storage memory as second table output data when said upper bit data is an even number, while outputting output data of said even address table storage memory as second table output data when said upper bit data is an odd number; and a weighting operation part for performing a weighting operation on said first table output data and said second table output data based on lower bit data excluding said predetermined bit number of upper bit data among said input data, interpolating between each of said table output data, and calculating output data.

5. A data conversion circuit for converting intended input data into output data using a look-up table for conversion which defines correspondences between input and output, the data conversion circuit comprising:

an adder for adding "1" to first table input data which is upper bit data having a bit length corresponding to an input format of said look-up table for conversion among said input data, to yield second table input data;

a look-up table storage memory storing said look-up table for conversion, for outputting first table output data associated with said first table input data using the look-up table for conversion, as well as outputting second table output data associated with said second table input data using the same said look-up table for conversion;

a weighting operation part for performing a weighting operation on said first table output data and said second table output data based on lower bit data excluding said predetermined bit number of upper bit data among said input data, interpolating between each of said table output data, and calculating output data; and a specific value designating part, when the first table input data inputted to said adder and said look-up table storage memory is the maximum value, for forcefully designating a specific value preliminary determined as a value corresponding to the maximum value as said second table output data.

6. The data conversion circuit according to claim 5, wherein said specific value is designated so that the bit length thereof is longer than that of said second table output data, the data conversion circuit further comprising:

a bit length adjuster for adding the value "zero" on the lower bit side so as to coincide respective bit lengths of said first table output data and said second table output data with the bit length of said specific value.

7. The data conversion circuit according to claim 6, wherein the bit length of said specific value is set as same as the bit number of said output data.

8. A data conversion circuit for converting intended input data into output data using a look-up table for conversion which defines correspondences between input and output, the data conversion circuit comprising:

an adder for adding "1" to first table input data which is upper bit data having a bit length corresponding to an input format of said look-up table for conversion among said input data, to yield second table input data;

a look-up table storage memory storing said look-up table for conversion, for outputting first table output data associated with said first table input data using the look-up table for conversion, as well as outputting second table output data associated with said second table input data using the same said look-up table for conversion;

a weighting operation part for performing a weighting operation on said first table output data and said second table output data based on lower bit data excluding said predetermined bit number of upper bit data among said input data, interpolating between each of said table output data, and calculating output data; and an overflow preventing part for inputting said upper bit data of said input data before subjected to addition by said adder, as said second table input data to said look-up table storage memory when the first table input data inputted to said adder and said look-up table storage memory is the maximum value, thereby preventing overflow of said second table input data.

9. The data conversion circuit according to claim 1, further comprising:

an overflow preventing part for inputting said upper bit data of said input data before subjecting to addition by said adder as said second table input data to said look-up table storage memory when the first table input data inputted to said adder and said look-up table storage memory is the maximum value, thereby preventing overflow of said second table input data.

10. The data conversion circuit according to claim 2, further comprising:

an overflow preventing part for inputting said upper bit data of said input data before subjecting to addition by said adder as said second table input data to said look-up table storage memory when the first table input data inputted to said adder and said look-up table storage memory is the maximum value, thereby preventing overflow of said second table input data.

11. The data conversion circuit according to claim 4, further comprising:

an overflow preventing part for inputting said upper bit data of said input data before subjecting to addition by said adder as said second table input data to said look-up table storage memory when the first table input data inputted to said adder and said look-up table storage memory is the maximum value, thereby preventing overflow of said second table input data.

12. The data conversion circuit according to claim 1, wherein said look-up table for conversion has input/output characteristic data for performing γ conversion of image data.

13. The data conversion circuit according to claim 2, wherein said look-up table for conversion has input/output characteristic data for performing γ conversion of image data.

14. The data conversion circuit according to claim 4, wherein said look-up table for conversion has input/output characteristic data for performing γ conversion of image data.

15. The data conversion circuit according to claim 5, wherein said look-up table for conversion has input/output characteristic data for performing γ conversion of image data.

16. A data conversion method for converting intended input data into output data using a look-up table for conversion, the look-up table being stored in a look-up table storage memory and defining correspondences between input and output, the data conversion method comprising the following steps:

a first step of adding "1" to first table input data which is upper bit data having a bit length corresponding to an input format of said look-up table for conversion among said input data by a predetermined adding process, to yield second table input data;

a second step of outputting from said look-up table storage memory, first table output data associated with said first table input data using the look-up table for conversion, as well as outputting, from said look-up table storage memory, second table output data associated with said second table input data using the same said look-up table for conversion; and a third step of performing a weighting operation on said first table output data and said second table output data based on lower bit data excluding said predetermined bit number of upper bit data among said input data by a predetermined weighting process, interpolating between each of said table output data, and calculating output data having a bit length which is longer than that of said first table output data and said second table output data, wherein said look-up table storage memory is a dual port memory to which said first table input data and said second table input data are inputted simultaneously, and from which said first table output data and said second table output data are outputted simultaneously.

17. A data conversion method for converting intended input data into output data using a look-up table for conversion, the look-up table being stored in a look-up table storage memory which is a single port memory and for defining correspondences between input and output, the data conversion method comprising the following steps:

a first step of adding "1" to first table input data which is upper bit data having a bit length corresponding to an input format of said look-up table for conversion among said input data by a predetermined adding process, to yield second table input data;

a second step of outputting from said look-up table storage memory, first table output data associated with said first table input data using the look-up table for conversion, as well as outputting, from said look-up table storage memory, second table output data associated with said second table input data using the same said look-up table for conversion; and a third step of performing a weighting operation on said first table output data and said second table output data based on lower bit data excluding said predetermined bit number of upper bit data among said input data by a predetermined weighting process, interpolating between each of said table output data, and calculating output data having a bit length which is longer than that of said first table output data and said second table output data, wherein in said second step, said first table input data or said second table input data is alternately switched and inputted to said look-up table storage memory, and said first table output data or said second table output data to be outputted from said look-up table storage memory is alternately switched and selected, and in this case, said first table output data is selected in a first pulse condition within a single cycle of clock signal for synchronizing output of said output data, while said second table output data is selected in a second pulse condition within said single cycle of clock signal.

18. The data conversion method according to claim 17, wherein in said third step, timing of inputting said lower bit data for said weighting operation is synchronized with an operation of switching said table output data by a predetermined delay process.

19. A data conversion method for converting intended input data into output data using a look-up table for conversion, the look-up table being stored in a look-up table storage memory and defining correspondences between input and output, the data conversion method comprising the following steps:

a first step of adding "1" to first table input data which is upper bit data having a bit length corresponding to an input format of said look-up table for conversion among said input data by a predetermined adding process, to yield second table input data;

a second step, when a value of the upper bit data among said input data is an even number, for storing the value in an even address table storage memory configured by a single port memory;

a third step, when a value of the upper bit data among said input data is an odd number, for storing the value in an odd address table storage memory configured by a single port memory;

a fourth step, by means of a first address selector arranged at input of said even address table storage memory, for inputting said first table input data as an address of said even address table storage memory when said upper bit data is an even number, while inputting said second table input data as an address of said even address table storage memory when said upper bit data is an odd number;

a fifth step, by means of a second address selector arranged at input of said odd number address table storage memory, for outputting said second table input data as an address of said odd number address table storage memory when said upper bit data is an even number, while outputting said first table input data as an address of said odd number address table storage memory when said upper bit data is an odd number;

a sixth step, by means of a first data selector arranged at outputs of said even address table storage memory and said odd address table storage memory, for outputting output data of said even address table storage memory as first table output data when said upper bit data is an even number, while outputting output data of said odd address table storage memory as first table output data when said upper bit data is an odd number;

a seventh step, by means of a second data selector arranged at outputs of said even address table storage memory and said odd address table storage memory, for outputting output data of said odd address table storage memory as second table output data when said upper bit data is an even number, while outputting output data of said even address table storage memory as second table output data when said upper bit data is an odd number; and an eighth step of performing a weighting operation on said first table output data and said second table output data based on lower bit data excluding said predetermined bit number of upper bit data among said input data by way of a predetermined weighting process, interpolating between each of said table output data, and calculating output data.

20. A data conversion method for converting intended input data into output data using a look-up table for conversion, the look-up table being stored in a look-up table storage memory and defining correspondences between input and output, the data conversion method comprising the following steps:

a first step of adding "1" to first table input data which is upper bit data having a bit length corresponding to an input format of said look-up table for conversion among said input data by a predetermined adding process, to yield second table input data;

a second step of outputting from said look-up table storage memory, first table output data associated with said first table input data using the look-up table for conversion, as well as outputting, from said look-up table storage memory, second table output data associated with said second table input data using the same said look-up table for conversion; and a third step of performing a weighting operation on said first table output data and said second table output data based on lower bit data excluding said predetermined bit number of upper bit data among said input data by a predetermined weighting process, interpolating between each of said table output data, and calculating output data having a bit length which is longer than that of said first table output data and said second table output data, wherein in said second step, when the first table input data inputted to said adder and said look-up table storage memory is the maximum value, a specific value preliminary determined as a value corresponding to the maximum value is forcefully designated as said second table output data by a predetermined specific value designating process.

21. The data conversion method according to claim 20, wherein in said second step, said specific value is designated so that the bit length thereof is longer than that of said second table output data, the value "zero" is added on the lower bit side by a predetermined bit length adjusting process so that the respective bit lengths of said first table output data and said second table output data coincide with the bit length of said specific value.

22. The data conversion method according to claim 21, wherein the bit length of said specific value is set as same as the bit number of said output data.

23. A data conversion method for converting intended input data into output data using a look-up table for conversion, the look-up table being stored in a look-up table storage memory and defining correspondences between input and output, the data conversion method comprising the following steps:

a first step of adding "1" to first table input data which is upper bit data having a bit length corresponding to an input format of said look-up table for conversion among said input data by a predetermined adding process, to yield second table input data;

a second step of outputting from said look-up table storage memory, first table output data associated with said first table input data using the look-up table for conversion, as well as outputting, from said look-up table storage memory, second table output data associated with said second table input data using the same said look-up table for conversion; and a third step of performing a weighting operation on said first table output data and said second table output data based on lower bit data excluding said predetermined bit number of upper bit data among said input data by a predetermined weighting process, interpolating between each of said table output data, and calculating output data having a bit length which is longer than that of said first table output data and said second table output data, wherein in said second step, when the first table input data inputted to said adder and said look-up table storage memory is the maximum value, said upper bit data of said input data before subjecting to addition by said adder is inputted as said second table input data to said look-up table storage memory by a predetermined overflow preventing process, thereby preventing overflow of said second table input data.

24. The data conversion method according to claim 16, wherein in said second step, when the first table input data inputted to said adder and said look-up table storage memory is the maximum value, said upper bit data of said input data before subjecting to addition by said adder is inputted as said second table input data to said look-up table storage memory by a predetermined overflow preventing process, thereby preventing overflow of said second table input data.

25. The data conversion method according to claim 17, wherein in said second step, when the first table input data inputted to said adder and said look-up table storage memory is the maximum value, said upper bit data of said input data before subjecting to addition by said adder is inputted as said second table input data to said look-up table storage memory by a predetermined overflow preventing process, thereby preventing overflow of said second table input data.

26. The data conversion method according to claim 19, wherein in said second step, when the first table input data inputted to said adder and said look-up table storage memory is the maximum value, said upper bit data of said input data before subjecting to addition by said adder is inputted as said second table input data to said look-up table storage memory by a predetermined overflow preventing process, thereby preventing overflow of said second table input data.

27. The data conversion method according to claim 16, wherein said look-up table for conversion has input/output characteristic data for performing $\gamma$ conversion of image data.

28. The data conversion method according to claim 17, wherein said look-up table for conversion has input/output characteristic data for performing $\gamma$ conversion of image data.

29. The data conversion method according to claim 19, wherein said look-up table for conversion has input/output characteristic data for performing $\gamma$ conversion of image data.

30. The data conversion method according to claim 20, wherein said look-up table for conversion has input/output characteristic data for performing $\gamma$ conversion of image data.

* * * * *